(12) United States Patent
Bajjuri et al.

(10) Patent No.: US 8,557,943 B2
(45) Date of Patent: Oct. 15, 2013

(54) NANOSTRUCTURED ORGANOSILICATES FROM THERMALLY CURABLE BLOCK COPOLYMERS

(75) Inventors: Krishna S. Bajjuri, San Jose, CA (US); Qiu Dai, Sunnyvale, CA (US); Alshakim Nelson, Campbell, CA (US); Jitendra S. Rathore, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 13/097,712

(22) Filed: Apr. 29, 2011

(65) Prior Publication Data

US 2012/0277339 A1 Nov. 1, 2012

(51) Int. Cl.
*C08G 77/12* (2006.01)

(52) U.S. Cl.
USPC .................................. 528/31; 528/32; 528/25

(58) Field of Classification Search
USPC ............................................... 528/32, 31, 25
See application file for complete search history.

(56) References Cited

U.S. PATENT DOCUMENTS

| 3,632,793 | A | | 1/1972 | Antonen |
|---|---|---|---|---|
| 5,019,644 | A | * | 5/1991 | Cavezzan et al. ............. 428/447 |
| 5,804,099 | A | | 9/1998 | Heilen et al. |
| 7,129,370 | B2 | | 10/2006 | Yamahiro et al. |
| 7,157,118 | B2 | | 1/2007 | Soldani |
| 7,563,917 | B2 | | 7/2009 | Yamahiro et al. |
| 2007/0122749 | A1 | | 5/2007 | Fu et al. |
| 2008/0311402 | A1 | | 12/2008 | Jung et al. |

FOREIGN PATENT DOCUMENTS

| KR | 10-0555941 B1 | 3/2006 |
|---|---|---|
| KR | 10-0817440 B1 | 3/2008 |

OTHER PUBLICATIONS

Josef Bauer et al., Tunable Block Copolymers Based on a Polysiloxane Backbone by Anionic Ring-Opening Polymerization, Journal of Polymer Science: Part A: Polymer Chemistry 42:3975-3985 (2004).
C.T. Kresge et al., Ordered Mesoporous Molecular Sieves Synthesized by a Liquid-Crystal Template Mechanism, Nature 359:710-712 (1992).
Teddie Magbitang et al., Oriented Nanoporous Lamellar Organosilicates Templated from Topologically Unsymmetrical Dendritic-Linear Block Copolymers, Angew. Chem. Int. Ed. 44:7574-7580 (2005).
Rajaram A. Pai et al., Synthesis of Mesoporous Organosilicate Films in Supercritical Carbon Dioxide, Adv. Mater. 18:241-245 (2006).
Tsuneo Yanagisawa et al., The Preparation of Alkyltrimethylammonium-Kanemite Complexes and Their Conversion to Microporous Materials, Bull. Chem. Soc. Jpn., 63(4):988-992 (1990).
International Search Report and Written Opinion for PCT/US2012/032887 dated Dec. 26, 2012.

\* cited by examiner

*Primary Examiner* — Kuo-Liang Peng
(74) *Attorney, Agent, or Firm* — Karen Canaan; CanaanLaw, P.C.

(57) ABSTRACT

Provided are inorganic-organic block copolymers that self assemble without the addition of a precursor. The inorganic block of the polymers includes silicon and the organic block may be any organic polymer. The inorganic-organic block copolymers self assemble to form a material in which the inorganic polymer block may be crosslinked to produce an organosilicate and/or silica matrix, and further thermal curing of the matrix results in the formation of a porous nanostructured film.

25 Claims, 13 Drawing Sheets

PMAES-*b*-PLactide

NANOSTRUCTURED ORGANOSILICATES FROM THERMALLY CURABLE BLOCK COPOLYMERS

TECHNICAL FIELD

The present invention relates generally to self-assembled nanostructures. More specifically, the present invention relates to silicon-containing inorganic-organic block copolymer compositions that are capable of self-assembling and forming nanostructured organo silicates.

BACKGROUND OF THE INVENTION

Nature utilizes self assembly to construct, as well as organize, well-defined biopolymers, such as DNA, RNA, and proteins. These biopolymers have inspired synthetic chemists to use the concept of self assembly and directed self assembly to create well-defined nanostructured materials. Advances in synthetic polymer chemistry have enabled the synthesis of polymers with defined molecular weight, composition, and low polydispersity. As a result of these advances, block copolymers have been identified as useful macromolecular tectons for self assembly. Block copolymers self assemble into a range of morphologies that enable their utility in a number of potential applications, such as lithography, composites, plastics, and low-k dielectrics. The ordered phases obtained by the block copolymers are largely dictated by the characteristics of the polymer, such as the polymer composition, the degree of polymerization of the polymer under certain conditions, and the effective segment-segment compatibility parameter ($\chi$) of the polymer.

Among the first class of self-assembling block copolymers to be used for the preparation of porous dielectric materials were amphiphilic surfactants, such as cetyltrimethylammonium bromide (CTAB). Self-assembling block copolymers, such as pluronics, have also been investigated for the preparation of porous dielectric materials. Beyond porous dielectric materials, polystyrene/poly(ethylene oxide) (PS-PEO) block copolymers have been combined with inorganic precursors to generate inorganic nanostructures for patterning applications.

Currently used processes for generating silicate nanostructures from self-assembling block copolymers require the following: (1) co-assembling an organic component, such as a block copolymer, with an inorganic precursor such as tetraethoxysilane (TEOS) or a silsesquioxane polymer, such as methylsilsesquioxane (MSSQ); and (2) condensing the inorganic component to form a crosslinked silicate matrix. The crosslinked matrix can be further thermally treated to decompose the organic segments to form a nanoporous silicate.

SUMMARY OF THE INVENTION

The present invention expands upon what is known in the art of self-assembling block copolymers by providing a silicon-containing inorganic-organic block copolymer that self assembles into an organosilicate or a silica matrix without the addition of an inorganic precursor.

In one aspect of the present invention, there is provided a method of preparing a nanostructured organosilicate film comprising the steps of: (a) preparing a self-assembled material from a block copolymer comprising (i) at least one of an alpha-, beta-, or gamma-substituted polysiloxane polymer block, and (ii) an organic polymer block, wherein the polysiloxane polymer block directly transforms into an organosilicate and/or silica matrix comprising an inorganic domain and an organic domain; (b) curing the self-assembled material at a temperature in the range of 20° C. to 450° C. to crosslink the inorganic domain to form a nanostructured organosilicate matrix; and optionally (c) curing the nanostructured organosilicate matrix at a temperature in the range of 300° C. to 500° C. for approximately 1 h to form a porous nanostructured film.

In one embodiment, the self-assembled material of step (b) is cured at a temperature in the range of 50° C. to 300° C.

In another embodiment, the self-assembled material of step (b) is cured at a temperature in the range of 20° C. to 120° C. in the presence of an acid catalyst.

In a further embodiment, the organic polymer block is selected from the group consisting of acrylate polymers, methacrylate polymers, poly(alkylenes), poly(butadienes), poly(carbonates), poly(esters), poly(lactides), poly(isoprenes), poly(norbornenes), poly(styrenes), and substituted poly(styrenes).

In another embodiment, the inorganic polysiloxane polymer block is selected from the group consisting of poly(methyl acetoxyethyl)siloxane); poly(methyl thioacetoxyethylsiloxane); poly(methyl hydroxyethylthioethylsiloxane); poly(methyl carboxyethylthioethylsiloxane); poly(methyl ethylureaethylthioethylsiloxane); poly(methyl oxiranylsiloxane); and poly(methyl 1,2-dihydroxyethylsiloxane).

In a further embodiment, the self-assembling block copolymer further comprises a photoacid generator (PAG), wherein the block copolymer may be irradiated after step (a) to form an acid. The PAG may be selected from the group consisting of triphenylsulfonium nonaflate; (trifluoro-methylsulfonyloxy)-bicyclo[2.2.1]hept-5-ene-2,3-dicarboximide (MDT); N-hydroxy-naphthalimide (DDSN); onium salts; benzoin tosylate; t-butylphenyl α-(p-toluenesulfonyloxy)-acetate; t-butyl α-(p-toluenesulfonyloxy)-acetate; sulfonic acid esters of N-hydroxyamides, imides, or combinations thereof; nitrobenzyl esters; s-triazine derivatives; N-camphorsulfonyloxynaphthalimide; N-pentafluorophenylsulfonyloxynaphthalimide; ionic iodonium sulfonates; perfluoroalkanesulfonates; aryl triflates; pyrogallol derivatives; trifluoromethanesulfonate esters of hydroxyimides; α,α'-bissulfonyl-diazomethanes; sulfonate esters of nitro-substituted benzyl alcohols; naphthoquinone-4-diazides; and alkyl disulfones.

In another aspect of the present invention, there is provided a composition comprising a block copolymer comprising a polysiloxane-containing inorganic polymer block and an organic polymer block, wherein the polysiloxane-containing inorganic polymer block comprises a monomer repeat unit selected from the group consisting of structure (I) and structure (II):

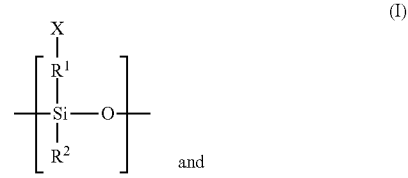

-continued

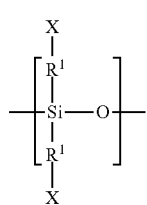
(II)

wherein R¹ is independently alkylene; R² is selected from C1-C20 alkyl, cycloalkyl, aryl, aromatic; and X is independently an electronegative group.

In one embodiment, R¹ is independently selected from the group consisting of methylene, ethylene, and propylene; R² is selected from the group consisting of methyl and ethyl; and X is independently selected from the group consisting of acetoxy, substituted acetoxy, thioacetoxy, substituted thioacetoxy, benzoyl, substituted benzoyl, bromine, chlorine, and iodine.

In a further aspect of the present invention, there is provided a composition comprising a block copolymer comprising a polysiloxane-containing inorganic polymer block and an organic polymer block, wherein the polysiloxane-containing inorganic polymer block comprises a monomer repeat unit selected from the group consisting of structure (III) and structure (IV):

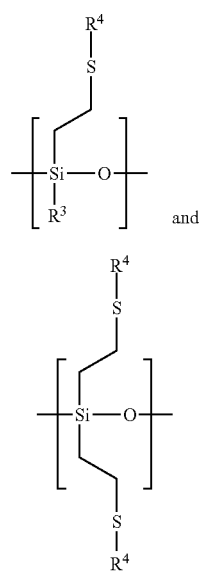

(III)

(IV)

wherein R³ is selected from the group consisting of C1-C20 alkyl, cycloalkyl, aryl, and aromatic; and R⁴ is independently selected from C1-C20 alkyl, cycloalkyl, aryl, hydroxy alkyl, alkylamine, alkylamide, and alkylurea.

In one embodiment, R³ is selected from the group consisting of methyl and ethyl; and R⁴ is independently selected from the group consisting of hydroxyethylthioethyl, carboxyethylthioethyl, and ethylureaethylthioethyl.

In another aspect of the present invention, there is provided a composition comprising a block copolymer comprising a polysiloxane-containing inorganic polymer block and an organic polymer block, wherein the polysiloxane-containing inorganic polymer block comprises a monomer repeat unit selected from the group consisting of structure (V) and structure (VI):

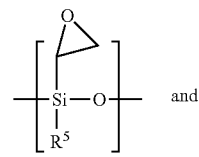

(V)

(VI)

wherein R⁵ is selected from the group consisting of alkyl, cycloalkyl, aryl, and aromatic.

In one embodiment, R⁵ is selected from the group consisting of methyl and ethyl.

In a further aspect of the present invention, there is provided a composition comprising a block copolymer comprising a polysiloxane-containing inorganic polymer block and an organic polymer block, wherein the polysiloxane-containing inorganic polymer block comprises a monomer repeat unit selected from the group consisting of structure (VII) and structure (VIII):

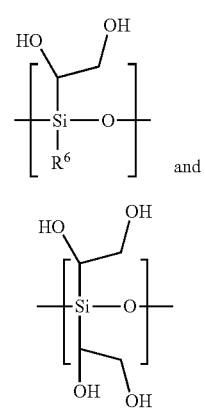

(VII)

(VIII)

wherein R⁶ is selected from the group consisting of alkyl, cycloalkyl, aryl, and aromatic.

In one embodiment, R⁶ is selected from the group consisting of methyl and ethyl.

Additional aspects and embodiments of the invention will be provided, without limitation, in the detailed description of the invention that is set forth below.

DETAILED DESCRIPTION OF THE INVENTION

Figure 1:
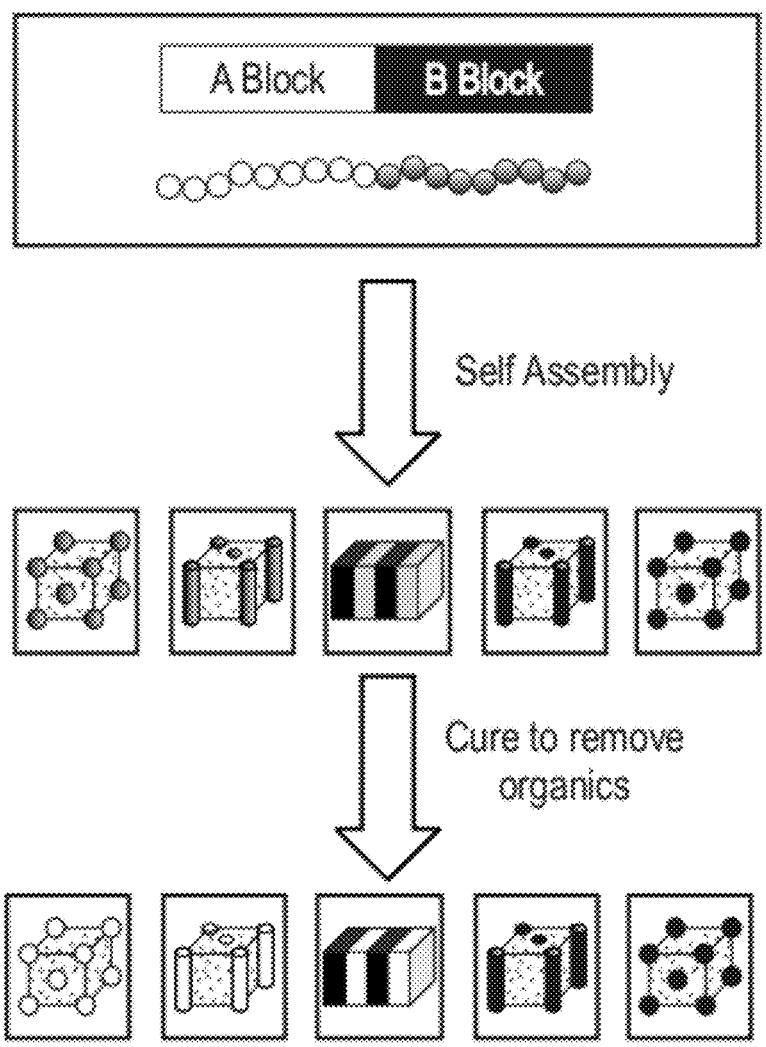
FIG. 1 is a schematic representation of the formation of nanostructured porous organosilicate films according to methods of the present invention.

Set forth below is a description of what are currently believed to be preferred embodiments of the present invention. Any alternates or modifications in function, purpose, or structure are intended to be covered by the claims of this application. As used in this specification and the appended claims, the singular forms "a," "an," and "the" include plural referents unless the context clearly dictates otherwise. The terms "comprises" and/or "comprising," as used in this specification and the appended claims, specify the presence of stated features, integers, steps, operations, elements, and/or components, but do not preclude the presence or addition of one or more other features, integers, steps, operations, elements, components, and/or groups thereof.

The term "block copolymer" refers to a polymer that is comprised of two homopolymer subunits linked by covalent bonds. The individual blocks of a block copolymer will typically be distinct chemical species and will be referred to herein as "inorganic polymer block" "organic polymer block," or "polymer block."

The term "matrix" is used to refer to a hardened inorganic-organic crosslinked polymer compound that is produced from the self-assembly of the block copolymers described herein. The term "film" is used to refer to the crosslinked polymer compound that has been cured to remove the organic block. Within the context of the present invention, it is to be understood that the terms "self-assembled material" or "inorganic-organic block copolymer" refers to the block copolymers of the present invention before crosslinking and that the terms "organosilicate matrix," "silica matrix," "organosilicate film," and "crosslinked nanostructure" refer to the block copolymers after crosslinking.

The terms "direct transformation" and "directly transformed," as used with respect to the formation of a nanostructure from an inorganic-organic block copolymer of the present invention, means that the crosslinked nanostructure is formed from the block copolymer without the addition of a separate precursor. For example, the direct transformation of an organosilicate or silica matrix from a silicon-containing inorganic-organic block copolymer means that the silicon-containing inorganic-organic block copolymer crosslinks to form the organosilicate or silica matrix without the addition of a silica precursor (such as TEOS or methylsilsesquioxane (MSSQ)).

The present invention is directed to compositions and methods for forming self-assembled nanostructures from a block copolymer comprising an inorganic polymer block and an organic polymer block, wherein the inorganic polymer block contains silicon and the inorganic-organic block copolymer undergoes direct transformation into an organosilicate or silica matrix. An advantage of the present invention is that the inorganic-organic block copolymers of the present invention can be self assembled into the hardened organosilicate or silica matrix without the addition of a silica precursor (such as TEOS or MSSQ).

In one embodiment of the invention, an inorganic-organic block copolymer comprises a substituted polysiloxane-containing inorganic polymer block that undergoes a thermally induced direct transformation to form a silsesquioxane or silicate matrix. Formula I shows a schematic representation of an inorganic-organic block copolymer system of the present invention, wherein a substituted polysiloxane inorganic polymer block is thermally induced to transform into methylsilsesquioxane. In Formula I, Block 2 is the organic polymer, which as noted above, may be a polymer of any composition; and m and n are integers ranging from 3 to 10,000.

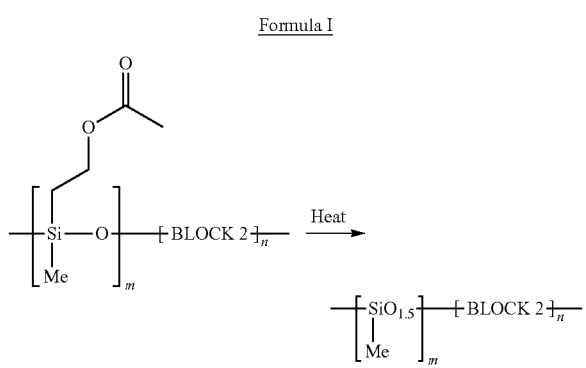

Formula I

The substituted polysiloxane inorganic polymer block of the present invention undergoes a thermal rearrangement to form an organosilicate matrix $R^2SiO_{1.5}$, $R^3SiO_{1.5}$, or $R^5SiO_{1.5}$, or a pure silica matrix $SiO_2$. In one embodiment of the present invention, a β-substituted sidechain of the silicon-containing inorganic polymer block is an acetoxyethyl functionality and the organic polymer block is a polylactide (see Examples 1-3). In another embodiment of the present invention, the acetoxyethyl substituted inorganic polymer block is coupled with dimethyl(octadecyl)silane (see Example 4). In a further embodiment of the present invention, the acetoxyethyl substituted inorganic polymer block is coupled with trimethylsilane (see Example 5). The use of other siloxane inorganic polymer blocks with α-, β-, and γ-substituted electron withdrawing groups exhibit the same behavior as the acetoxyethyl substituted inorganic polymer blocks (see Examples 11-13, and 16).

In another embodiment of the present invention, the inorganic polymer block is a polysiloxane-containing polymer block comprising a monomer repeat unit selected from the group consisting of structure (I) and structure (II):

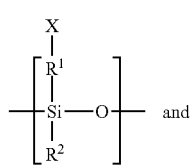

(I)

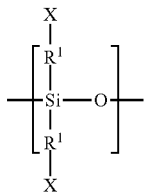

(II)

wherein $R^1$ is independently alkylene; $R^2$ is selected from the group consisting of C1-C20 alkyl, cycloalkyl, aryl, and aromatic; and X is independently an electronegative group. In a preferred embodiment, $R^1$ is independently selected from the group consisting of methylene, ethylene, and propylene; $R^2$ is selected from the group consisting of methyl and ethyl; and X is independently selected from the group consisting of acetoxy, substituted acetoxy, thioacetoxy, substituted thioacetoxy, benzoyl, substituted benzoyl, bromine, chlorine, and iodine.

In a further embodiment of the present invention, the inorganic polymer block is a polysiloxane-containing polymer block comprising a monomer repeat unit selected from the group consisting of structure (III) and structure (IV):

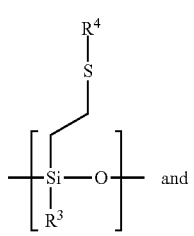

(III)

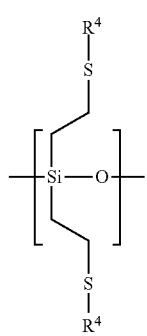

(IV)

wherein $R^3$ is selected from the group consisting of C1-C20 alkyl, cycloalkyl, an aryl, and an aromatic; $R^4$ is selected from the group consisting of C1-C20 alkyl, cycloalkyl, aryl, hydroxy alkyl, alkylamine, alkylamide, and alkylurea. In a preferred embodiment, $R^3$ is selected from the group consisting of methyl and ethyl.

In another embodiment of the present invention, the inorganic polymer block is a polysiloxane-containing polymer block comprising a monomer repeat unit selected from the group consisting of structure (V) and structure (VI):

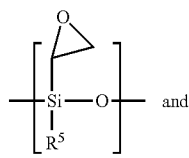

(V)

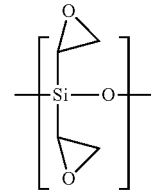

(VI)

wherein $R^5$ is selected from the group consisting of alkyl, cycloalkyl, aryl and aromatic. In a preferred embodiment, $R^5$ is selected from the group consisting of methyl and ethyl.

In another embodiment of the present invention, the inorganic polymer block is a polysiloxane-containing polymer block comprising a monomer repeat unit selected from the group consisting of structure (VII) and structure (VIII):

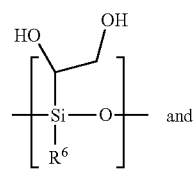

(VII)

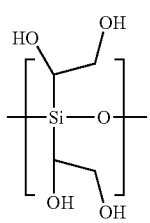

(VIII)

wherein $R^6$ is selected from the group consisting of alkyl, cycloalkyl, aryl and aromatic. In a preferred embodiment, $R^5$ is selected from the group consisting of methyl and ethyl.

The inorganic polymer block of the present invention may have a weight averaged molecular weight of about 1000 to 500,000, with a preferred weight averaged molecular weight of about 7,000 to 30,000.

In one embodiment of the present invention, the inorganic polymer block is a polysiloxane-containing inorganic polymer block selected from the group consisting of poly(methyl acetoxyethyl)siloxane); poly(methyl thioacetoxyethylsiloxane); poly(methyl hydroxyethylthioethylsiloxane); poly(methyl carboxyethylthioethylsiloxane); poly(methyl ethylureaethylthioethylsiloxane); poly(methyl oxiranylsiloxane); and poly(methyl 1,2-dihydroxyethylsiloxane).

The organic polymer block of the present invention may be a polymer of any composition. Examples of organic polymer blocks that may be used with the present invention include without limitation, acrylate polymers, methacrylate polymers, poly(alkylenes), poly(butadienes), poly(carbonates), poly(esters), poly(lactides), poly(isoprenes), poly(norbornenes), poly(styrenes), and substituted poly(styrenes).

The organic polymer block of the present invention may have a weight averaged molecular weight of about 200 to 500,000 with a preferred weight averaged molecular weight of about 7,000 to 30,000.

In another embodiment of the invention, the polymer is a multiblock copolymer comprised of at least 3 polymer blocks.

Figure 5A:
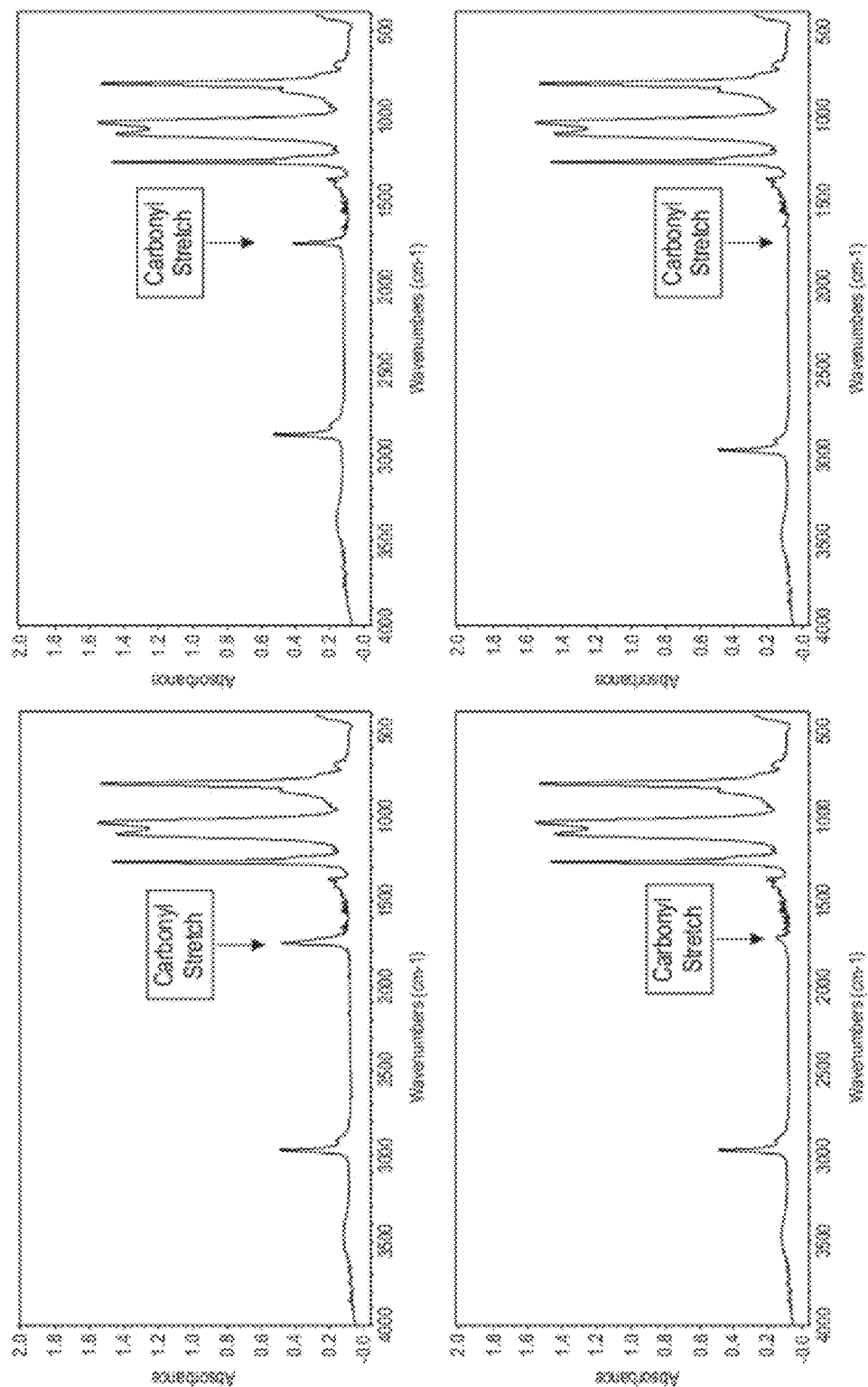
FIG. 5A shows the results of the FT-IR analysis performed on the PMAES polymer-only films described in Example 9.
Figure 5B:
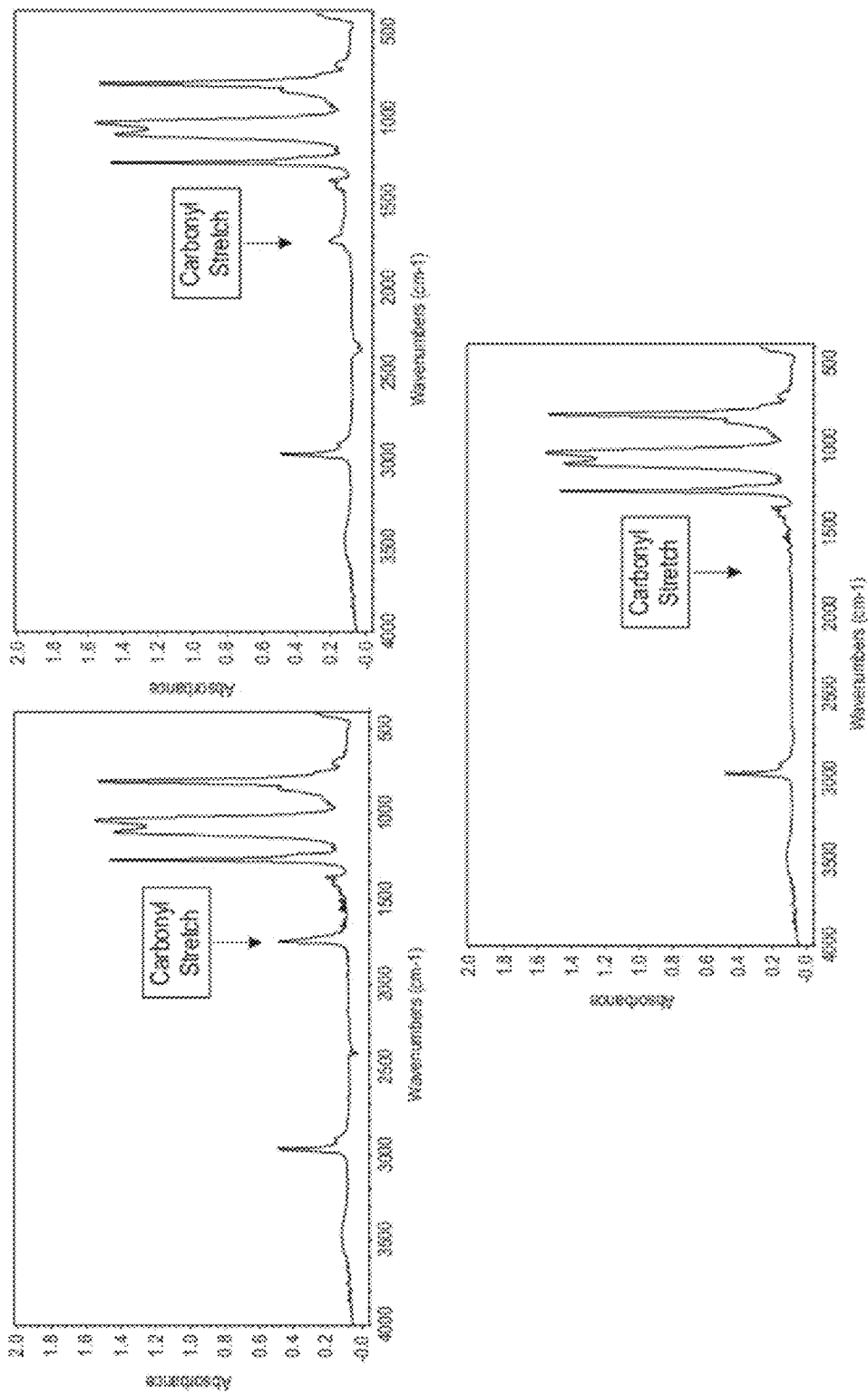
FIG. 5B shows the results of the FT-IR analysis performed on the PMAES acid-catalyzed polymer films described in Example 9.

The direct transformation of the silicon-containing inorganic-organic block copolymer into the organosilicate or silica matrix typically occurs at temperatures above 150° C.; however, the same transformation can occur at reduced temperatures in the presence of an acid catalyst. Acids that catalyze the transformation include, but are not limited to, hydrochloric acid, hydrobromic acid, hydroiodic acid, sulfuric acid, phosphoric acid, nitric acid, alkylsulfonic acids, aryl- and substituted aryl sulfonic acids, and fluorinated organic acids. Acid-catalyzed transformation of the silicon-containing polymer blocks of the present invention may occur at temperatures ranging from −50 to 300° C., with temperatures ranging from 0 to 150° C. preferred, and temperatures ranging from 20 to 120° C. more preferred. Example 9 and FIGS. 5A and 5B shows FT-IR analyses for block copolymers transformed with and without an acid catalyst (para-toluenesulphonic acid). As shown therein, the non-acid-catalyzed organosilicate films were transformed at 300° C. while the acid-catalyzed films were completely transformed at 200° C.

In another embodiment of the invention, a base is used to catalyze the transformation of the inorganic block into an organosilicate. Bases that catalyze the transformation include alkali hydroxides, organic hydroxides, alkali alkoxides, and organic bases. Base-catalyzed transformation of the silicon-containing polymer blocks of the present invention may occur at temperatures ranging from −50 to 300° C., with temperatures ranging from 0 to 150° C. preferred, and temperatures ranging from 20 to 120° C. more preferred.

In a further embodiment of the invention, a photo-acid generator (PAG) is added to the self-assembling inorganic-organic block copolymers. The PAG is selected from the group consisting of triphenylsulfonium nonaflate; (trifluoromethylsulfonyloxy)-bicyclo[2.2.1]hept-5-ene-2,3-dicarboximide (MDT); N-hydroxy-naphthalimide (DDSN); onium salts; benzoin tosylate; t-butylphenyl α-(p-toluenesulfonyloxy)-acetate; t-butyl α-(p-toluenesulfonyloxy)-acetate; sulfonic acid esters of N-hydroxyamides, imides, or combinations thereof; nitrobenzyl esters; s-triazine derivatives; N-camphorsulfonyloxynaphthalimide; N-pentafluorophenylsulfonyloxynaphthalimide; ionic iodonium sulfonates; perfluoroalkanesulfonates; aryl triflates; pyrogallol derivatives; trifluoromethanesulfonate esters of hydroxyimides; α,α'-bis-sulfonyl-diazomethanes; sulfonate esters of nitro-substituted benzyl alcohols; naphthoquinone-4-diazides; and alkyl disulfones.

In another embodiment of the invention, there is provided a method of self-assembling the inorganic-organic block copolymers of the present invention to form a crosslinked nanostructured organosilicate matrix comprising the steps of: (a) preparing a self-assembled material of the inorganic-organic block copolymer of the present invention; (b) curing the material at a temperature between 20° C. and 450° C. to form a crosslinked nanostructured organosilicate matrix; and (c) optionally, thermally curing the crosslinked nanostructured organosilicate matrix at a temperature in the range of 300° C. to 500° C. to form a porous nanostructured matrix. According to the method of the present invention, the step of heating the self-assembled block copolymer to a temperature between 20° C. to 450° C., with a temperature of 50° C. and 300° C. preferred, directly transforms the inorganic polymer block to a nanostructured crosslinked organosilicate matrix comprising an inorganic domain and an organic domain. The crosslinking of the inorganic block results in a crosslinked organosilicate nanostructure, which can be subsequently thermally cured to remove the organic domain and form a porous nanostructured film, as shown schematically in FIG. 1. Examples 6 and 7 and Table 2 show that the porous nanostructures obtained according to the method of the present invention have an elastic modulus in the range of 2.0 and a dielectric constant in the range of 2.5.

In another embodiment of the invention, there is provided a method of self-assembling the inorganic-organic block copolymers of the present invention in the presence of a PAG to form a crosslinked nanostructured organosilicate matrix comprising the steps of: (a) preparing a self-assembled material of the inorganic-organic block copolymer of the present invention; (b) irradiating the material to degrade the PAG to form acid; (c) curing the material at a temperature between 20° C. and 300° C. to form a crosslinked nanostructured organosilicate matrix; and (d) optionally, thermally curing the crosslinked nanostructured organosilicate matrix at a temperature in the range of 300° C. to 500° C. to form a porous nanostructured matrix. According to the method of the present invention, the step of heating an irradiated material of the self-assembled block copolymer in the presence of a PAG at a temperature in the range of 20° C. to 300° C., with a temperature between 20° C. and 120° C. preferred, directly transforms the inorganic polymer block to a nanostructured organosilicate matrix comprising an inorganic domain and an organic domain. The crosslinking of the inorganic block results in a crosslinked organosilicate nanostructure, which can be subsequently thermally cured to remove the organic domain and form a porous nanostructured film, as shown schematically in FIG. 1.

The crosslinked nanostructures and porous nanostructured films of the present invention have utility in a broad range of applications, such as for example, self-assembled photopatternable low-k dielectrics, including without limitation, chemically-amplified block copolymer resists; complex inorganic architectures, including without limitation, biometric assemblies; porous dielectrics, including without limitation, low-k dielectrics with controlled order and pore size; and organic-inorganic composites, including without limitation, core-shell architectures of controlled size.

It is to be understood that while the invention has been described in conjunction with the embodiments set forth above, the foregoing description as well as the examples that follow are intended to illustrate and not limit the scope of the invention. Further, it is to be understood that the embodiments and examples set forth herein are not exhaustive and that modifications and variations of the invention will be apparent to those of ordinary skill in the art without departing from the scope and spirit of the invention.

All patents and publications mentioned herein are incorporated by reference in their entireties.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

Where appropriate, the following techniques and equipment were used in the Examples: $^1$H and $^{13}$C NMR spectra were obtained at room temperature on an Avance 400 MHz spectrometer (Bruker BioSpin Corporation, Fremont, Calif.). Quantitative $^{13}$C NMR was run at room temperature in acetone-$d_6$ in an inverse-gated $^1$H-decoupled mode using Cr(acac)$_3$ as a relaxation agent on an Avance 400 MHz spectrometer. Molecular weights were measured in tetrahydrofuran (THF) on a Waters Model 150 chromatograph (Waters Corp., Milford, Mass.) relative to polystyrene standards. Infrared (IR) spectra were recorded on a NICOLET® 510 Fourier transformed infrared (FT-IR) spectrometer (Nicolet Instrument Corp., Madison, Wis.) on a film cast on a potassium bromide (KBr) plate. Film thickness was measured on a KLA-TENCOR® alpha-step 2000 (KLA-Tencor, Milpitas, Calif.). A quartz crystal microbalance (QCM) was used to study the dissolution kinetics of the resist films in an aqueous tetramethylammonium hydroxide (TMAH) solution (CD-26). Also used for the dissolution kinetic experiments was a VISTEC® LEICA® VB6 tool (nominal spot size of 12 nm) at 100 keV and a current of 0.5 nA/cm$^2$ (Vistec Semiconductor Systems, Fremont, Calif.; Leica Microsystems IR GmbH, Germany). The resist film patterns were generated with L-EDIT® (Layout Editor drawing tool, Tanner Research, Monrovia, Calif.), converted to GDS file format, and fragmented with CATS® software (Syopsys, Inc., Mountain View, Calif.) into a file readable by the pattern generator.

Example 1

Synthesis of Poly(Methyl Acetoxyethyl)Siloxane-b-Polylactide Copolymer (PMAES-b-PLAC: 17,000-b-3,000)

A 100 mL two necked round-bottom flask equipped with a magnetic stirrer and a nitrogen inlet was charged with a mixture of tetramethyltetracyclosiloxane (D$_4$H$_4$) (4.24 g, 15 mmol), cyclohexane (3 mL), and 2M butyl lithium (BuLi) solution (0.11 mL, 0.22 mmol). The mixture was stirred for 15 min at room temperature followed by the addition of 0.5 mL of THF. The viscosity of the reaction mixture increased rapidly after the addition of THF due to the ring opening polymerization of D$_4$H$_4$. The reaction mixture was allowed to stir for a total of 2 min before being quenched by the addition of [3-(benzyloxy)propyl]chlorodimethylsilane (0.66 mmol). Thereafter, the product, benzyloxypropyl-terminated polymethylhydrosiloxane, was precipitated with an excess of cold ethyl ether and dried overnight under a vacuum. The hydrosilylation of the benzyloxypropyl-terminated polymethylhydrosiloxane was performed with vinyl acetate using chloroplatinic acid hexahydrate as catalyst and cyclohexane as solvent to yield benzyloxypropyl-terminated poly(methyl acetoxyethyl)siloxane (PMAES). The benzyloxypropyl-terminated PMAES was subsequently deprotected with 5 wt % palladium/carbon and hydrogen-gas to furnish hydroxyl-terminated PMAES. The dried product was characterized with multinuclear nuclear magnetic resonance (NMR) and gel permeation chromatography (GPC) to predict the microstructures of the polymers. The NMR/GPC experiments yielded the following results: average molecular weight (M$_n$)~17,000; polydispersity index (PDI) ~1.1.

Figure 2:
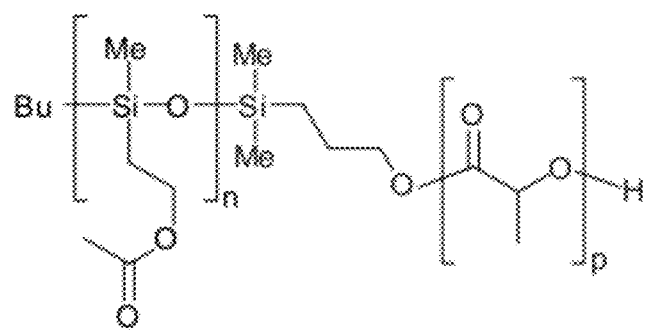
FIG. 2 is a schematic representation of the synthesis of the PMAES-b-PLac block copolymer described in Examples 1 and 2.

To prepare PMAES-b-polylactide (PMAES-b-PLac) copolymer, hydroxyl-terminated PMAES was used as the initiator to ring-open rac-lactide and grow a polylactide block. The following were weighed in stoichiometric amounts and dissolved in dry toluene until a clear solution was obtained: organocatalyst 1,8-diazabicyclo[5.4.0]undec-7-ene (DBU) (0.085 g, 0.00056 mol); catalyst promoter (thiourea) (0.042 g, 0.00056 mol); and hydroxyl-terminated PMAES. Next, rac-lactide (2.0 g, 0.014 mol) was added to the clear solution. Polymerizations proceeded for 2 h, after which an excess of benzoic acid was added (approximately 3-fold) to quench the polymerization reaction by protonating the catalyst. The PMAES-b-PLac block copolymer was obtained by precipitating in cold diethyl ether. After drying the block copolymer under a vacuum, the product was analyzed by multinuclear NMR and GPC to yield the following results: M$_n$~20,000; PDI~1.5. The combined results of this experiment show the numerical equivalent of the microstructures of PMAES-b-PLac to be 17,000-b-3,000. FIG. 2 shows a schematic representation of the synthesis of PMAES-b-PLac. The structure of PMAES(17K)-b-PLac(3K) described herein is represented by structure (IX).

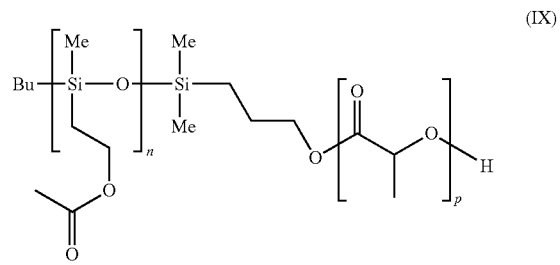

Example 2

Synthesis of Poly(Methyl Acetoxyethyl)Siloxane-b-Polylactide Copolymer (PMAES-b-PLAC: 7,000-b-7,000)

A 100 mL two necked round-bottom flask equipped with a magnetic stirrer and a nitrogen inlet was charged with a mixture of D$_4$H$_4$ (4.24 g, 15 mmol), cyclohexane (3 mL), and 2M BuLi solution (0.11 mL, 0.22 mmol). The mixture was stirred for 15 min at room temperature followed by the addition of 0.5 mL of THF. The viscosity of the reaction mixture increased rapidly after the addition of THF due to the ring-opening polymerization of D$_4$H$_4$. The reaction mixture was allowed to stir for a total of 2 min before being quenched by the addition of [3-(benzyloxy)propyl]chlorodimethylsilane (0.66 mmol). Thereafter, the product, benzyloxypropyl-terminated polymethylhydrosiloxane, was precipitated with an excess of cold ethyl ether and dried overnight under vacuum. The hydrosilylation of the benzyloxypropyl-terminated polymethylhydrosiloxane was performed with vinyl acetate using chloroplatinic acid hexahydrate as a catalyst and cyclohexane as a solvent to yield benzyloxypropyl-terminated PMAES. The benzyloxypropyl-terminated PMAES was subsequently deprotected with 5 wt % palladium/carbon and hydrogen to form hydroxyl-terminated PMAES. The dried product was characterized with multinuclear NMR and GPC to predict the microstructures of the polymers as follows: M$_n$~7,000; PDI~1.1.

To prepare PMAES-b-PLac copolymer, hydroxyl-terminated PMAES was used as the initiator to ring-open rac-lactide and grow a polylactide block. The following were weighed in stoichiometric amounts and dissolved in dry toluene until a clear solution was obtained: DBU (0.04 g, 0.00028 mol), thiourea (0.021 g, 0.00028 mol), and hydroxyl-terminated PMAES. Next, rac-lactide (2.0 g, 0.014 mol) was added to the clear solution. Polymerizations were carried out for 2 h after which an (approximate) 3-fold excess of benzoic acid was added to quench the polymerization reaction by protonating the catalyst. The PMAES-b-PLac block copolymer was obtained by precipitating in cold diethyl ether. After drying the block copolymer under vacuum, the product was analyzed by multinuclear NMR and GPC to yield the following results: $M_n$~14,000; PDI~1.5. The combined results of this experiment show the numerical equivalent of the microstructures of PMAES-b-PLac to be 7,000-b-7,000.

Example 3

Synthesis of Poly(Methyl Acetoxyethyl)Siloxane-b-Polylactide Copolymer (PMAES-b-PLAC: 3,000-b-17,000)

A 100 mL two-neck round-bottom flask equipped with a magnetic stirrer and a nitrogen inlet was charged with a mixture of $D_4H_4$ (4.24 g, 15 mmol), cyclohexane (3 mL), and 2M BuLi solution (0.11 mL, 0.22 mmol). The mixture was stirred for 15 min at room temperature followed by the addition of 0.5 mL of THF. The viscosity of the reaction mixture increased rapidly after the addition of THF due to the ring-opening polymerization of $D_4H_4$. The reaction mixture was allowed to stir for a total of 2 min before being quenched by the addition of [3-(benzyloxy)propyl]chlorodimethylsilane (0.66 mmol). Thereafter, the product, benzyloxypropyl-terminated polymethylhydrosiloxane, was precipitated with an excess of cold ethyl ether and dried overnight under a vacuum. The hydrosilylation of the benzyloxypropyl-terminated polymethylhydrosiloxane was performed with vinyl acetate using chloroplatinic acid hexahydrate as a catalyst and cyclohexane as a solvent to yield benzyloxypropyl-terminated PMAES. Next, the benzyloxypropyl-terminated PMAES was deprotected with 5 wt % palladium/carbon and hydrogen-gas to furnish hydroxyl-terminated PMAES. The dried product was characterized with multinuclear NMR and GPC to predict the microstructures of the polymers as follows: $M_n$~3,000; PDI~1.1

To prepare PMAES-b-PLac copolymer, hydroxyl-terminated PMAES was used as the initiator to ring-open rac-lactide and grow a polylactide block. The following were weighed in stoichiometric amounts and dissolved in dry toluene until a clear solution was obtained: DBU (0.016 g, 0.0001 mol), thiourea (0.008 g, 0.0001 mol), and hydroxyl-terminated PMAES. Subsequently, rac-lactide (2.0 g, 0.014 mol) was added to the clear solution. Polymerizations were carried out for 2 h, after which an (approximate) 3-fold excess of benzoic acid was added to quench the polymerization reaction by protonating the catalyst. The PMAES-b-PLac block copolymer was obtained by precipitating in cold diethyl ether. After drying the block copolymer under a vacuum, the product was analyzed by multinuclear NMR and GPC to yield the following results: $M_n$~20,000; PDI~1.5. The combined results of this experiment show the numerical equivalent of the microstructures of PMAES-b-PLac to be 3,000-b-17,000. Table 1 shows a comparative outline of the $M_n$ and PDI values for the PMAES polymer and PMAES-b-PLac block copolymer of Examples 1, 2, and the instant example.

TABLE 1

|  | PMAES $M_n$ (PDI) | PMAES-b-PLac $M_n$ (PDI) |
|---|---|---|
| Example 1 | 17k (1.1) | 17k-b-3k (1.4) |
| Example 2 | 7k (1.2) | 7k-b-14k (1.4) |
| Example 3 | 3k (1.2) | 3k-b-17k (1.4) |

Example 4

Synthesis of Octadecyl-Terminated Poly(Methyl Acetoxyethyl)Siloxane (PMAES-b-$C_{18}$)

Figure 3A:
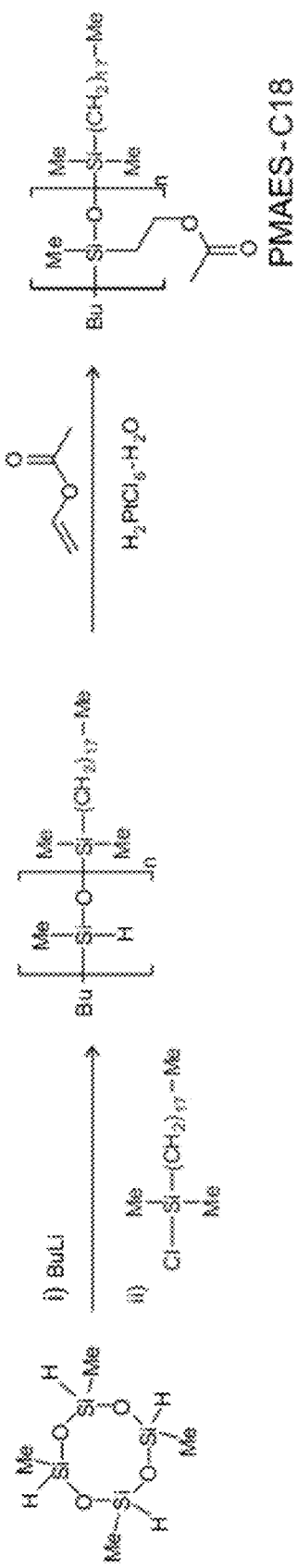
FIG. 3A is a schematic representation of the synthesis of the PMAES-b-C₁₈ block copolymer described in Example 4.
Figure 3B:
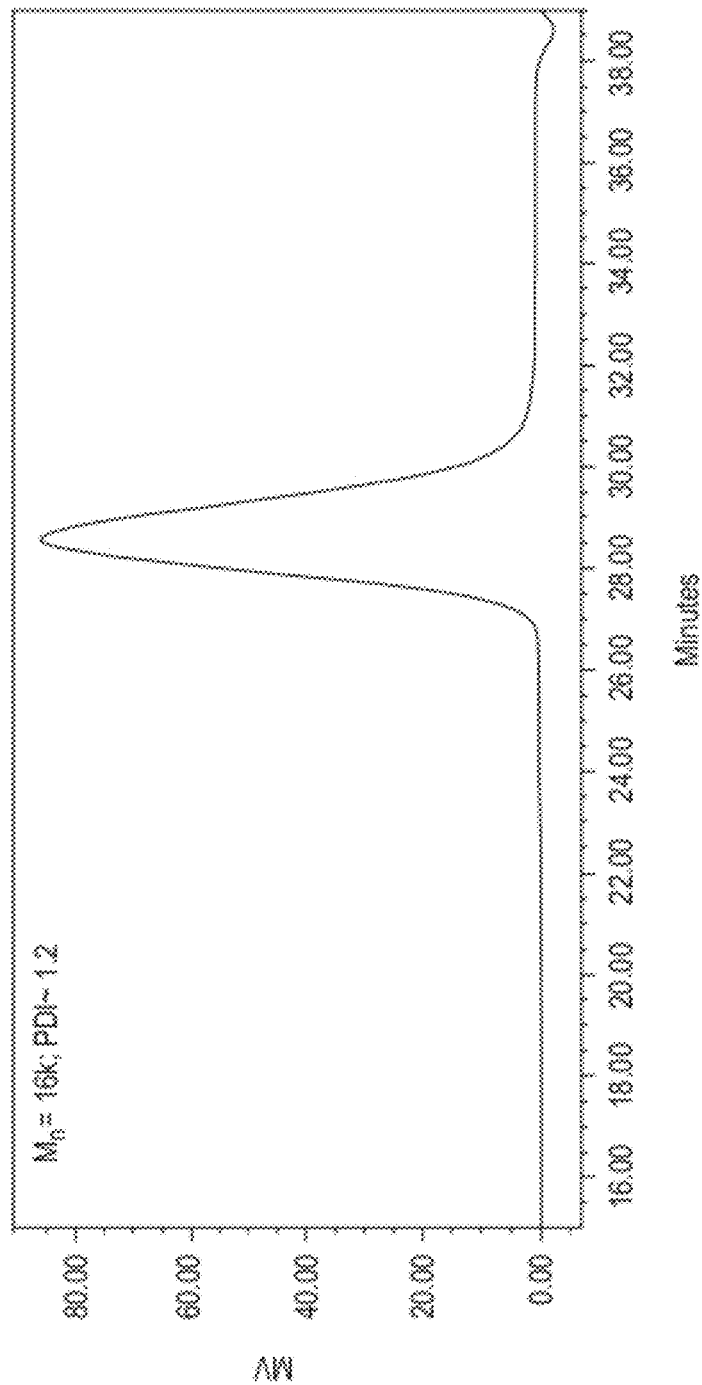
FIG. 3B is a graph that depicts the results of the NMR/GPC analysis of the PMAES-b-C₁₈ block copolymer described in Example 4.

A 100 mL two necked round-bottom flask equipped with a magnetic stirrer and a nitrogen inlet was charged with a mixture of $D_4H_4$ (4.24 g, 15 mmol), cyclohexane (3 mL), and 2M BuLi solution (0.11 mL, 0.22 mmol). The mixture was stirred for 15 min at room temperature followed by the addition of 0.5 mL of THF. The viscosity of the reaction mixture increased rapidly after the addition of THF due to the ring-opening polymerization of $D_4H_4$. The reaction mixture was allowed to stir for a total of 2 min before being quenched by the addition of chlorodimethyl(octadecyl)silane (0.09 g, 0.30 mmol). Thereafter, the product, octadecyl-terminated polymethylhydrosiloxane, was precipitated with an excess of cold ethyl ether and dried overnight under a vacuum. The hydrosilylation of the octadecyl-terminated polymethylhydrosiloxane was performed with vinyl acetate using chloroplatinic acid hexahydrate as a catalyst and cyclohexane as a solvent to yield the block copolymer octadecyl-terminated PMAES (PMAES-b-$C_{18}$). The NMR/GPC analysis yielded the following results: $M_n$~17,000; PDI~1.2. FIG. 3A shows a schematic representation of the synthesis of PMAES-b-$C_{18}$ and FIG. 3B shows the results of the NMR/GPC analysis. The structure of PMAES(17K)-b-$C_{18}$ is represented by structure (X).

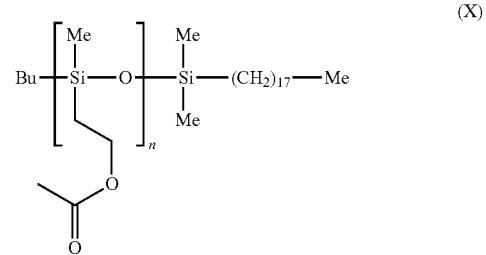

(X)

Example 5

Synthesis of Trimethylsilane-Terminated Poly(Methyl Acetoxyethyl)Siloxane (PMAES-TMS)

A 100 mL two necked round-bottom flask equipped with a magnetic stirrer and a nitrogen inlet was charged with a mixture of $D_4H_4$ (4.24 g, 15 mmol), cyclohexane (3 mL), and 2M BuLi solution (0.11 mL, 0.22 mmol). The mixture was stirred for 15 min at room temperature followed by the addition of 0.5 mL of THF. The viscosity of the reaction mixture increased rapidly after the addition of THF due to the ring-opening polymerization of $D_4H_4$. The reaction mixture was allowed to stir for a total of 2 min before being quenched by the addition of chlorotrimethylsilane (0.03 g, 0.30 mmol).

Thereafter, the product, trimethylsilane terminated polymethylhydrosiloxane, was precipitated with an excess of cold ethyl ether and dried overnight under vacuum. The hydrosilylation of the trimethylsilane terminated polymethylhydrosiloxane was performed with vinyl acetate using chloroplatinic acid hexahydrate as a catalyst and cyclohexane as a solvent to yield the block copolymer trimethylsilane terminated PMAES (PMAES-TMS). The NMR/GPC analysis yielded the following results: $M_n \sim 17{,}000$; PDI~1.2. The structure of PMAES(17K)-b-$C_{18}$ is represented by structure (XI).

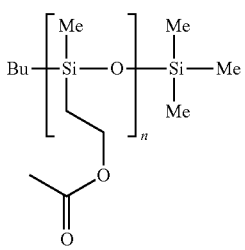

Example 6

Elastic Modulus

Elastic modulus measurements were obtained for the cured polymer films obtained from the block copolymers of Examples 1, 4, and 5 (after thermal curing at 420° C.) using surface acoustics wave spectroscopy (SAWS). Films of the polymers solutions (20 wt % solution with 2 wt % para-toluenesulphonic acid with respect to the polymer) were spin applied onto silicon wafers (spin cast at 3000 rpm) and then post-applied baked at 110° C. for 1 min and then annealed at 110° C. for 24 h under a vacuum. The hard bake of the polymer derived film was performed at 420° C. for 1 h (ramp rate 2° C./min). The elastic modulus for the block copolymers described in Examples 1, 4, and 5 was 1.6, 2.0, and 2.57 gigapascals (Gpa or $kN/mm^2$)

Example 7

Dielectric Constant

Dielectric constants were measured for the cured polymer films obtained from the block copolymers of Examples 1, 4, and 5 (after thermal curing at 420° C.). Films of the polymer solutions (20 wt % solution with 2 wt % para-toluenesulphonic acid with respect to the polymer) were spin applied onto silicon wafers (spin cast at 3000 rpm) and then post-applied baked at 110° C. for 1 min and then annealed at 110° C. for 24 h under a vacuum. The hard bake of the polymer derived film was performed at 420° C. for 1 h (ramp rate 2° C./min). The dielectric constants (k) for the block copolymers described in Examples 1, 4, and 5 were measured to be 2.4, 2.5, and 2.7 Gpa respectively. Table 2 presents a comparison of the film properties of PMAES-b-PLac, PMAES-b-$C_{18}$, and PMEAS-TMS of Examples 1, 4, and 5, respectively, including the elastic modulus results described in Example 6 and the dielectric constant (k) results described herein.

TABLE 2

| | Pre-Cure Thickness (nm) | Post-Cure Thickness (nm) | Density (g/cm³) | Modulus$_{SAWS}$ (GPa) | k (@ 25° C.) |
|---|---|---|---|---|---|
| PMAES-b-PLac | 870 | 443 | 1.00 | 1.6 | 2.4 |
| PMAES-$C_{18}$ | 843 | 445 | 1.05 | 2.0 | 2.5 |
| PMAES-TMS | 887 | 570 | 1.2 | 2.57 | 2.7 |

Example 8

Transmission Electron Microscopy (TEM) and Scanning Electron Microscopy (SEM)

Figure 4:
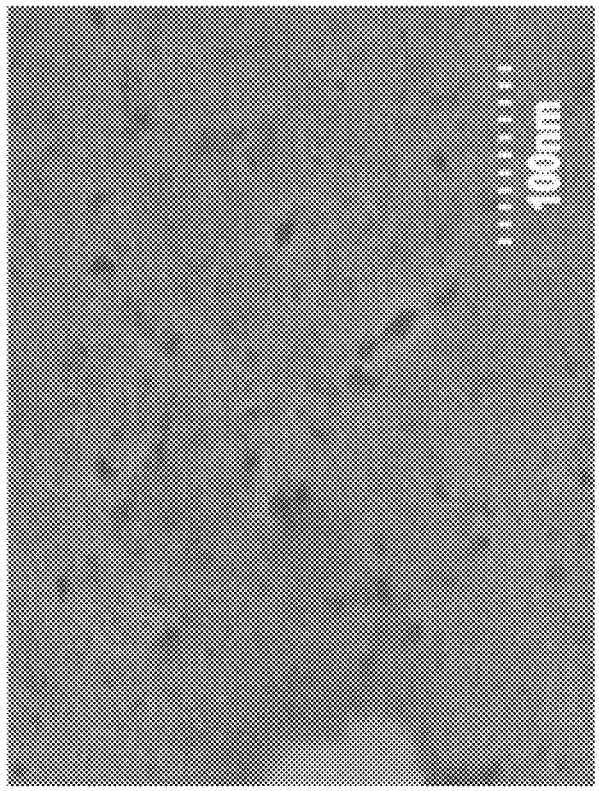
FIG. 4 shows SEM images of two different regions of the cured polymer films obtained from the PMAES-b-PLac block copolymer of Example 1.
Figure 4:
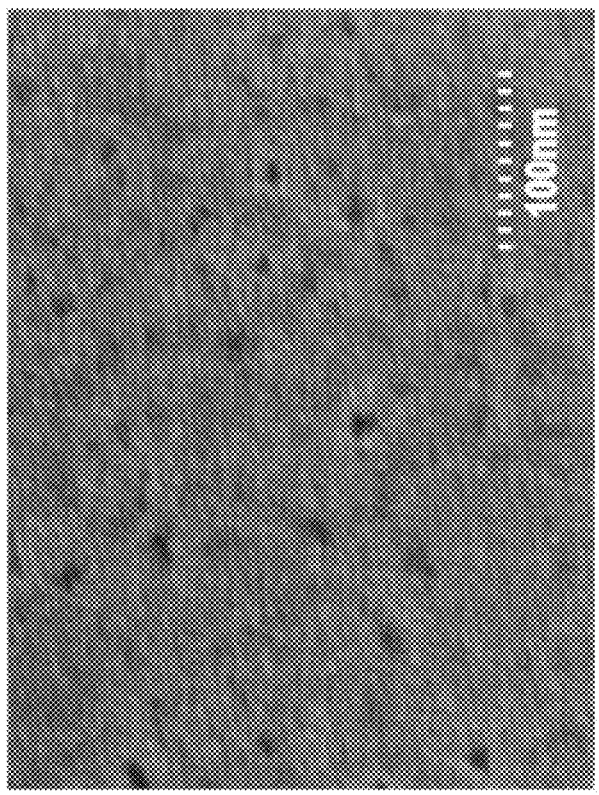

TEM and SEM analyses were conducted on thermally cured organosilicate films obtained from the block copolymers of Examples 1, 2, 5. Films of the polymer solutions (10 wt % solution with 2 wt % para-toluenesulphonic acid with respect to the polymer) were spin applied onto silicon wafers (spin cast at 3000 rpm) and then post-applied baked at 110° C. for 1 min; exposed to 248 nm light; post-exposure baked at 110° C. for 1 min; and then annealed at 110° C. for 24 h under a vacuum. The hard bake of the polymer derived film was performed at 420° C. for 1 h (ramp rate 2° C./min). FIG. 4 shows SEM images of two different sections of the cured polymer films obtained from the PMAES(17K)-b-PLac(3K) block copolymer of Example 1. As shown in FIG. 4, the cured organosilicate films have 10-20 nm pores.

Example 9

Fourier-Transformed Infrared Spectroscopy (FT-IR)

FT-IR analyses were conducted on the cured polymer films obtained from the block copolymers of Example 5. Spin casted films (at 2500 rpm) of polymer, or polymer mixed with 5 wt % para-toluenesulphonic acid with respect to the polymer, were baked at 120° C., 200° C., 250° C., and 300° C. for 1 h (ramp rate 2° C./min) along with an uncured control. Thereafter, the polymer films were scraped off the silicon wafers and mixed with dry potassium bromide (KBr) before being FT-IR analyzed. The extent of crosslinking in the films was followed by monitoring the carbonyl stretching at 1720 $cm^{-1}$. Complete crosslinking was noted at 300° C./1 h for polymer-only films; however, for the acid containing polymer films, the complete crosslinking temperature decreased to 200° C. FIG. 5A shows the results of the FT-IR analysis for the polymer-only films under the following conditions: no cure; 120° C. for 1 h; 250° C. for 1 h; and 300° C. for 1 hr. FIG. 5B shows the results of the FT-IR analysis for the acid-catalyzed polymer films under the following conditions: no cure, 120° C. for 1 h; and 200° C. for 1 hr.

Example 10

Differential Scanning Calorimetry (DSC)

Figure 6:
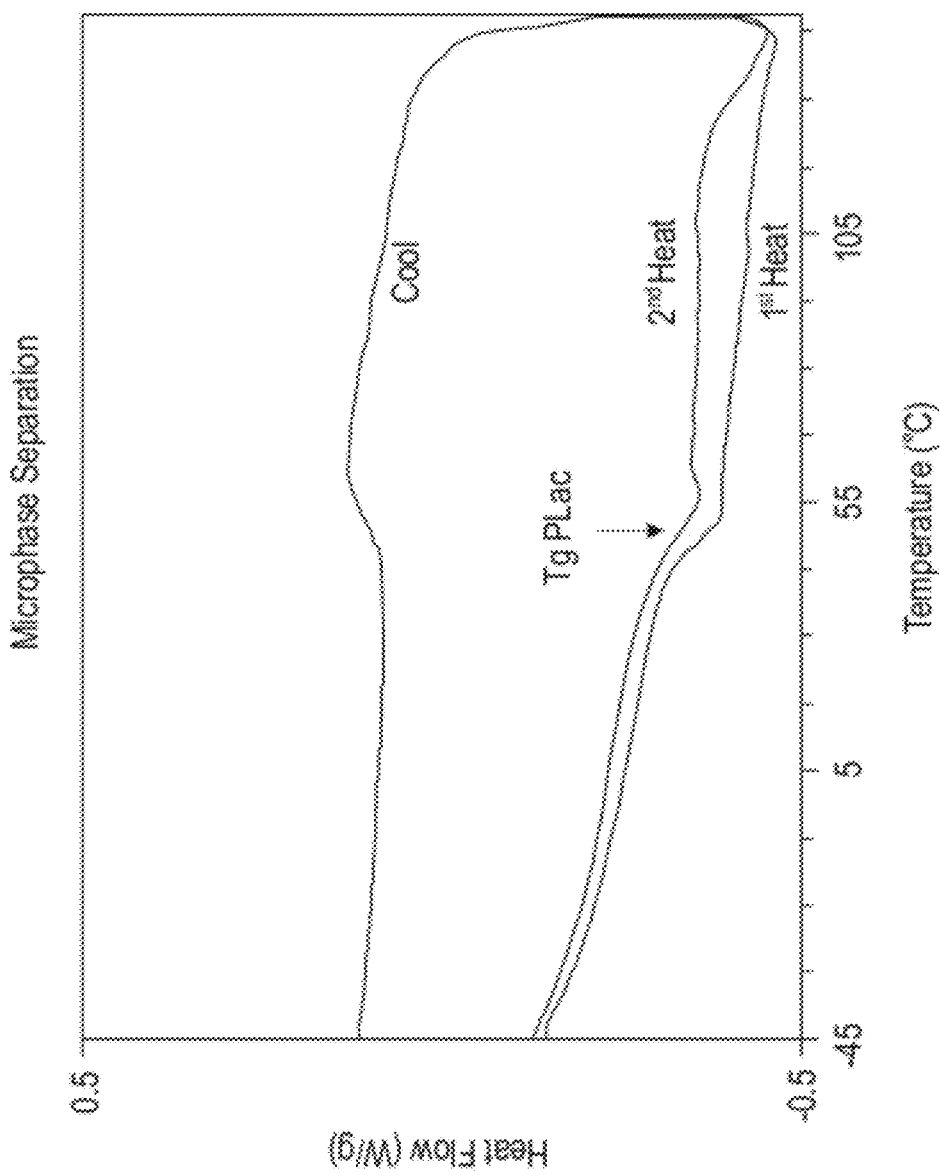
FIG. 6 is a graph that shows the microphase separation of the inorganic-organic block copolymer of the present invention.

DSC analysis was performed on the block copolymers of Examples 1 and 2. Spin casted films of polymer were baked at 250° C. for 1 h (ramp rate 5° C./min) to cross-link the inorganic polysiloxane block. The polymer film was scraped off the silicon wafers and analyzed under DSC, which showed a single glass transition temperature (Tg) at around 55° C., thus showing the microphase separation of the organic polylactide block. FIG. 6 is a graph showing the microphase separation of the inorganic and organic blocks of the block copolymers of Examples 1 and 2.

Example 11

Synthesis of Poly(Methylvinylsiloxane)

Hexamethylcyclotrisiloxane (5.7 mg) was added to a flask and placed under $N_2$ atmosphere. THF (0.1 mL) was charged to the flask followed by BuLi (38 μL of a 2 M solution in cyclohexane). The reaction mixture was stirred at ambient temperature for 30 min. Trimethyltrivinylcyclotrisiloxane (1.2 mL) was diluted in cyclohexane (1.2 mL) and added to the reaction mixture at 298 K. Additional THF (0.1 mL) was added and the reaction mixture was stirred for 16 h. Trimethylsilyl chloride (TMSCl) (150 μL) was used to stop the polymerization by reacting with the active chain ends. The resulting block copolymer, poly(methylvinylsiloxane) (2 g), was isolated by precipitation in MeOH. The NMR/GPC analysis yielded the following results: $M_n$~31.1 k, PDI~1.16.

Example 12

Synthesis of Poly(Methyl Thioacetoxyethylsiloxane)

Poly(methylvinylsiloxane) (3 g) was added to a flask and placed under $N_2$ atmosphere. Thioacetic acid (7.4 mL) and toluene (10 mL) were charged to the flask. Azo bis isobutyronitril (AiBN) was dissolved in 30 mL of toluene and added to the reaction mixture, which was heated at 323 K for 12 h. The resulting block copolymer, poly(methyl thioacetoxyethylsiloxane) (5 g), was isolated by precipitation in MeOH.

Example 13

Synthesis of Poly(Methyl Hydroxyethylthioethylsiloxane)

Poly(methylvinylsiloxane) (0.5 g) was added to a flask and placed under $N_2$ atmosphere. Mercaptoethanol (0.6 mL) and THF (1 mL) were charged to the flask. AiBN (100 mg) was dissolved in 4 mL of THF and added to the reaction mixture, which was heated at 328 K for 12 h. The solvent was removed from the reaction mixture using a rotary evaporator, redissolved in $CH_2Cl_2$, and the resulting block copolymer, poly (methyl hydroxyethylthioethylsiloxane) (1 g), was isolated by precipitation in toluene. The NMR/GPC analysis yielded the following results: $M_n$~20.6 k, PDI~1.18.

Example 14

Thermal Gravimetric Analysis of Poly(Methyl Hydroxyethylthioethylsiloxane)

Figure 7:
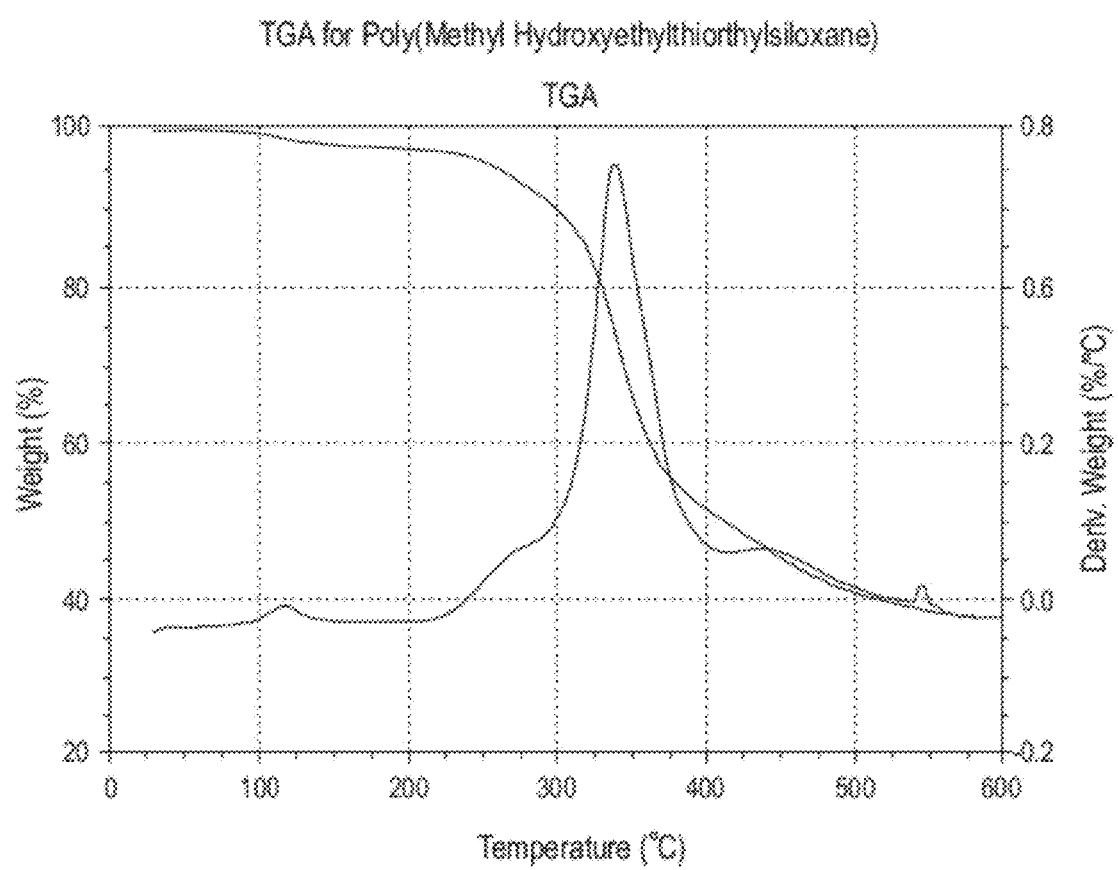
FIG. 7 is a graph that shows the results of the thermal gravimetric analysis for poly(methyl hydroxyethylthioethylsiloxane) block copolymer described in Example 14.

The poly(methyl hydroxyethylthioethylsiloxane) from Example 12 was analyzed by thermal gravimetric analysis to determine the temperature at which the polymer autocrosslinks to form MSSQ. The sample was heated to 600° C. at a rate of 10° C. min$^{-1}$. The onset of crosslinking was at 225° C. and was complete at 300° C. The 40% remaining at 600° C. represents the MSSQ. The results of the thermal gravimetric analysis described herein are shown graphically in FIG. 7.

Example 15

Figure 8A:
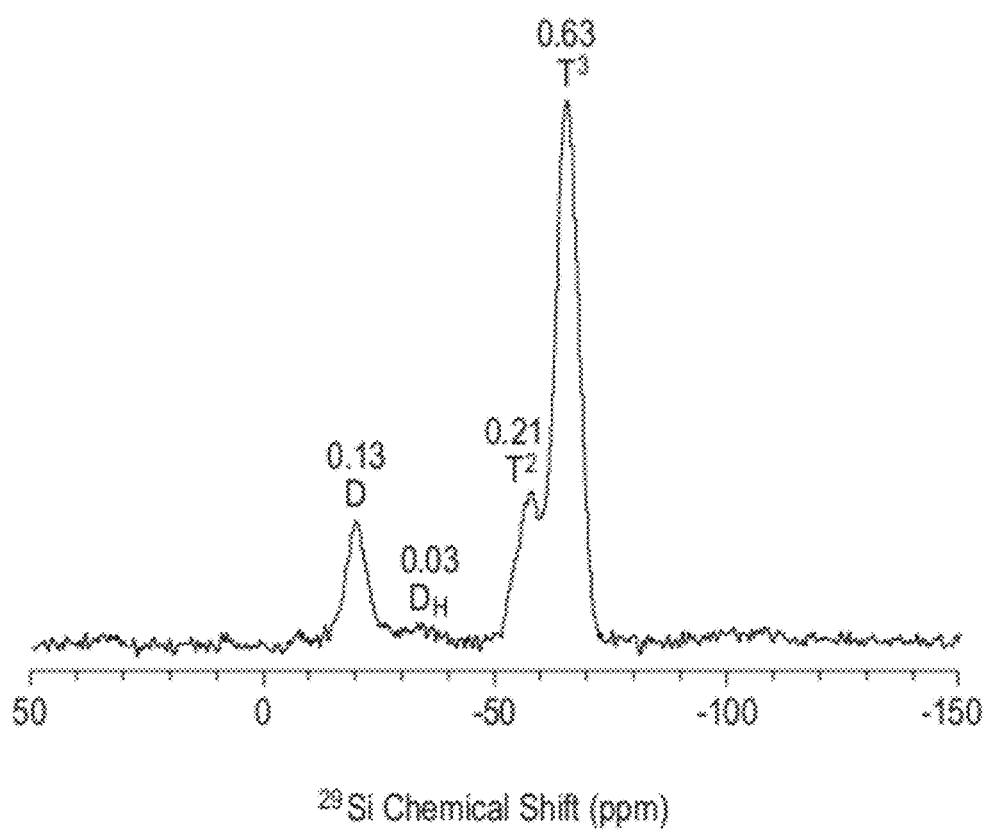
FIG. 8A shows the $^{29}$Si CPMAS NMR spectrum with 10 ms contact time for the MSSQ formed from curing the poly(methyl hydroxyethylthioethylsiloxane) block copolymer described in Example 15.
Figure 8B:
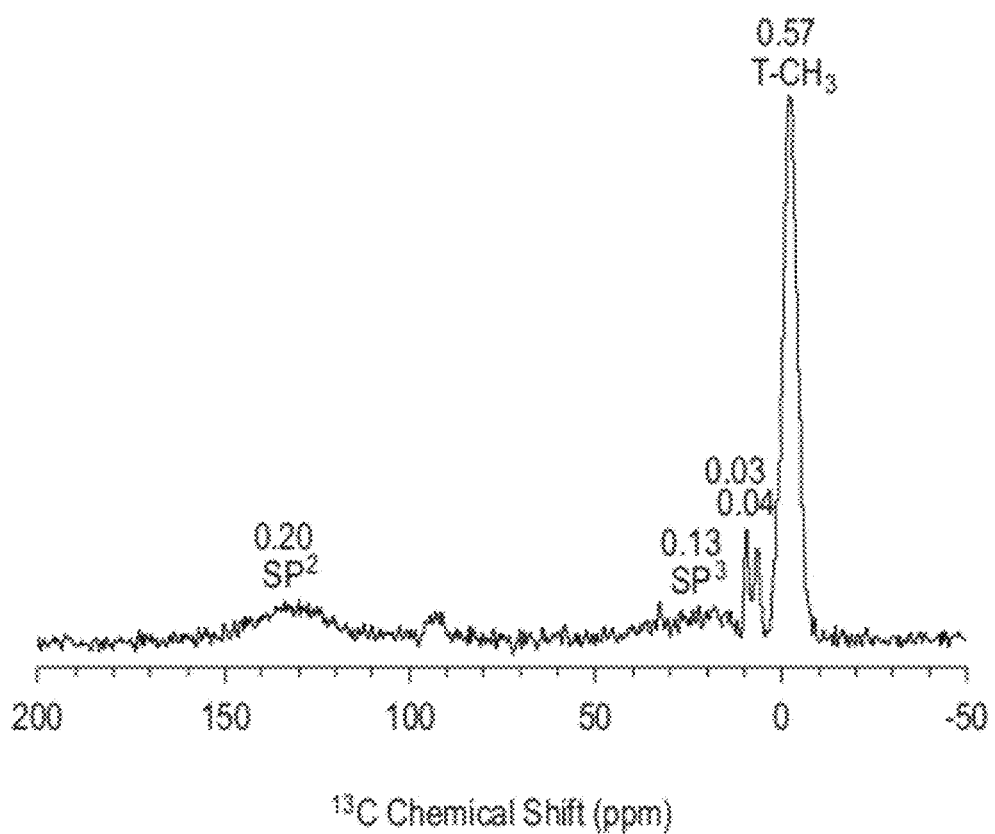
FIG. 8B shows the $^{13}$C CPMAS NMR spectrum with 3 ms contact time for the MSSQ formed from curing the poly(methyl hydroxyethylthioethylsiloxane) block copolymer described in Example 15.

$^{29}$Si NMR Analysis of Poly(Methyl Hydroxyethylthioethylsiloxane) Before and after Cure A $^{29}$Si NMR spectrum of poly(methyl hydroxyethylthioethylsiloxane) was acquired using an inverse-gated experiment with Cr(acac)$_3$ as a relaxation agent. The $^{29}$Si NMR spectrum showed a single peak at 25 ppm which is representative of the silicon atoms of the polymer to which two oxygens are attached. For comparison, a $^{29}$Si cross-polarization magic angle spinning (CPMAS) NMR spectrum of the polymer cured at 400° C. for 16 h was acquired. The formation of an MSSQ matrix was evidenced by the appearance of a broad resonance from 50-70 ppm, which indicated the presence of silicon atoms with three oxygens attached. FIG. 8A shows a $^{29}$Si CPMAS NMR spectrum with 10 ms contact time for the MSSQ formed from curing the poly(methyl hydroxyethylthioethylsiloxane) described herein at 400° C. for 1 h and FIG. 8B shows a $^{13}$C CPMAS NMR spectrum with 3 ms contact time for the MSSQ formed from curing the poly(methyl hydroxyethylthioethylsiloxane) described herein at 400° C. for 1 h.

Example 16

Synthesis of Poly(Methyl Oxiranylsiloxane)

Figure 9A:
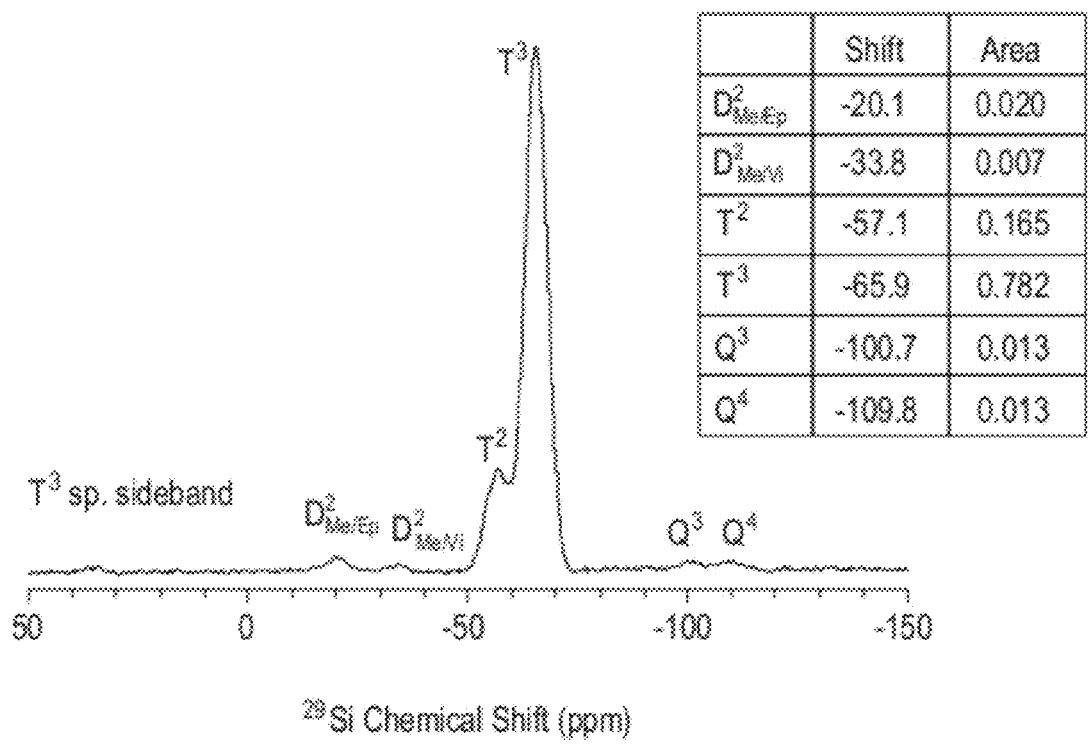
FIG. 9A shows the $^{29}$Si CPMAS NMR spectrum with 10 ms contact time for the MSSQ formed from curing the poly(methyl oxiranylsiloxane) block copolymer described in Example 16.
Figure 9B:
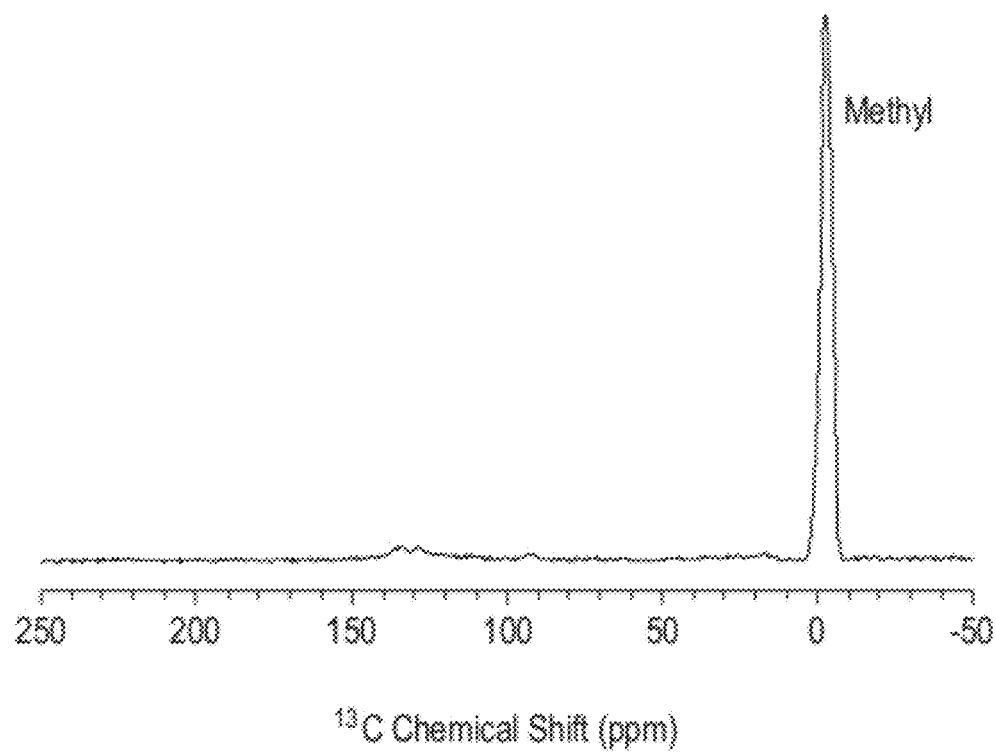
FIG. 9B shows the $^{13}$C CPMAS NMR spectrum with 3 ms contact time for the MSSQ formed from curing the poly(methyl oxiranylsiloxane) block copolymer described in Example 16.

The oxidizing agent m-chloroperoxybenzoic acid (MCPBA) (3 g) was dissolved in 100 mL dichloromethane ($CH_2Cl_2$) in a flask and stirred with sodium sulfate ($Na_2SO_4$) for 10 min. The solution was then filtered and added to a flask containing a solution of poly(methyl vinylsiloxane) (2.8 g) dissolved in $CH_2Cl_2$. The reaction mixture was heated at reflux for 24 h and then quenched with a saturated aqueous solution of sodium thiosulfate ($Na_2S_2O_3$). The organic fraction was collected and washed with sodium bicarbonate (NaHCO$_3$) (aq) and sodium chloride (NaCl) (aq), and then dried with $Na_2SO_4$. The solution was concentrated to form poly(methyl oxiranylsiloxane) (2.8 g). An MSSQ was formed from the poly(methyl oxiranylsiloxane) by curing the block copolymer at 400° C. for 1 h. FIG. 9A shows the $^{29}$Si CPMAS NMR spectrum with 10 ms contact time for the MSSQ formed from the curing of the poly(methyl oxiranylsiloxane) described herein and FIG. 9B shows the $^{13}$C CPMAS NMR spectrum with 3 ms contact time for the MSSQ formed from curing of the poly(methyl oxiranylsiloxane) described herein.

Example 17

Alternative Synthesis of Poly(Methyl Vinylsiloxane)

1,3,5,7-tetramethyl-1,3,5,7-tetravinylcyclotetrasiloxane ($D_{4Vi}$) (12.0 g) was charged into a 250 mL round-bottom flask. One drop of a phosphazene solution in hexane (1.0 M) was added via syringe at 100° C., after which the solution viscosity increased quickly. The reaction was then cooled to room temperature after 2 h. 100 mL $CH_2Cl_2$ and 50 μL trimethylsilyl chloride were added to the reaction and stirred for 1 h to quench the polymerization. The product was precipitated into methanol, and then washed with 100 mL 1M hydrogen chloride (HCl), aqueous NaHCO$_3$, aqueous NaCl, then dried with magnesium sulfate (MgSO$_4$). The product was heated at 130° C. under vacuum for 6 h to remove the unreacted $D_{4Vi}$ monomers. The reaction yielded 70% poly(methyl vinylsiloxane).

Example 18

Functionalization of Poly(Methyl Vinylsiloxane) With Mercaptoacetic Acid

Poly(methyl vinylsiloxane) (0.5 g; Mn=209,855; PDI=1.45; 5.8 mmol vinyl) was charged into a 100 mL round-bottom flask equipped with a magnetic stir bar. THF (20 mL), AiBN (0.6 mmol, 100 mg), and mercaptoacetic acid (11 mmol) were added and the solution was deoxygenated by bubbling dry nitrogen through the reaction mixture for 20 min. The reaction flask was placed into an oil bath at 60° C. After 10 h, the product was isolated by precipitation into toluene twice and then dried under vacuum overnight.

Example 19

Functionalization of Poly(Methyl Vinylsiloxane) with Urea

Cystamine (10 mL of 1.0 M solution in DMF) was charged into a 100 mL round-bottom flask equipped with a magnetic stir bar; ethyl isocyanate (790 µL/10 mmol) was added to the solution via a syringe. After stirring for 5 h at room temperature, a THF solution of poly(methyl vinylsiloxane) (PVMS) (0.5 g; Mn=209,855; PDI=1.45; 5.8 mmol vinyl) (40 mL) and AiBN (0.6 mmol/100 mg in 5 mL THF) were added. The solution was deoxygenated by bubbling dry nitrogen through the reaction mixture for 20 min. The reaction flask was placed into an oil bath at 60° C. After 10 h, the product was isolated by precipitation into toluene twice and then dried under vacuum overnight.

Example 20

Synthesis of Poly(Methyl 1,2-Dihydroxyethylsiloxane)

Sodium periodate (NaIO$_4$) (642 mg, 3 mmol) was stirred in 1.5 mL H$_2$O in a 50 mL round-bottom flask equipped with magnetic stir bar and overpressure valve. 2 N sulfuric acid (H$_2$SO$_4$) (400 µL, 0.4 mmol) was added. After all solids were dissolved, the solution was cooled to 0° C. A 0.1 M aqueous solution of ruthenium chloride (RuCl$_3$) (100 µL, 0.01 mmol) was added and the mixture was stirred until the color turned bright yellow. Ethyl acetate (6 mL) was added and stirring was continued for 5 min. Acetonitrile (6 mL) was added and stirring was continued for further 5 min. The polydimethylsiloxane (PDMS) olefin (200 mg, 0.01 mmol) was added in one portion and the resulting slurry was stirred overnight at room temperature. After evaporation of the solvents in vacuum, the crude product was purified by precipitating in diethyl ether (Et$_2$O).

Example 21

Thermal Gravimetric Data for Siloxane Polymers

Table 3 shows the thermal gravimetric data for four poly (methyl vinylsiloxane polymers) prepared according to the method of the present invention.

TABLE 3

| POLYMER | Onset of Thermal Rearrangement (° C.) |
| --- | --- |
| Poly(methyl vinylsiloxane) | 425 |
| Poly(methyl hydroxyethylthioethylsiloxane) | 225 |
| Poly(methyl carboxyethylthioethylsiloxane) | 180 |
| Poly(methyl ethylureaethylthioethylsiloxane) | 200 |

We claim:

1. A method of preparing a nanostructured organosilicate matrix comprising the steps of:
   (a) preparing a self-assembled material from a block copolymer comprising (i) at least one of an alpha-, beta-, and gamma-substituted polysiloxane polymer block, and (ii) an organic polymer block, wherein the polysiloxane polymer block directly transforms into an organosilicate and/or silica matrix comprising an inorganic domain and an organic domain; and
   (b) curing the self-assembled material at a temperature in the range of 20° C. to 450° C. to crosslink the inorganic domain to form a nanostructured organosilicate matrix.

2. The method of claim 1, wherein the self-assembled material of step (b) is cured at a temperature in the range of 50° C. to 300° C.

3. The method of claim 1, wherein the self-assembled material of step (b) is cured at a temperature in the range of 20° C. to 120° C. in the presence of an acid catalyst.

4. The method of claim 1, further comprising the step of:
   (c) curing the nanostructured matrix of step (b) at a temperature in the range of 300° C. to 500° C. for approximately 1 h to form a porous nanostructured film.

5. The method of claim 1, wherein the organic polymer block is selected from the group consisting of acrylate polymers, methacrylate polymers, poly(alkylenes), poly(butadienes), poly(carbonates), poly(esters), poly(lactides), poly (isoprenes), poly(norbornenes), poly(styrenes), and substituted poly(styrenes).

6. The method of claim 5, wherein the polysiloxane polymer block comprises a monomer repeat unit selected from the group consisting of structure (I) and structure (II):

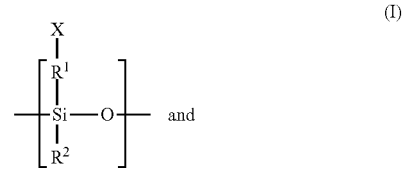

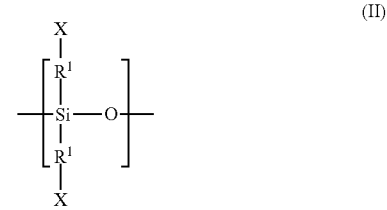

wherein
R$^1$ is independently alkylene;
R$^2$ is selected from the group consisting of C1-C20 alkyl, cycloalkyl, aryl, and aromatic;
and X is independently an electronegative group.

7. The method of claim 6, wherein

R¹ is independently selected from the group consisting of methylene, ethylene, and propylene;

R² is selected from the group consisting of methyl and ethyl; and

X is independently selected from the group consisting of acetoxy, substituted acetoxy, thioacetoxy, substituted thioacetoxy, benzoyl, substituted benzoyl, bromine, chlorine, and iodine.

8. The method of claim 5, wherein the polysiloxane polymer block comprises a monomer repeat unit selected from the group consisting of structure (III) and structure (IV):

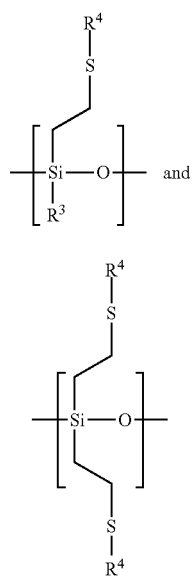

(III)

(IV)

wherein

R³ is selected from the group consisting of C1-C20 alkyl, cycloalkyl, aryl, and aromatic; and R⁴ is independently selected from the group consisting of C1-C20 alkyl, cycloalkyl, aryl, hydroxy alkyl, alkylamine, alkylamide, and alkylurea.

9. The method of claim 8, wherein

R³ is selected from the group consisting of methyl and ethyl; and

R⁴ is independently selected from the group consisting of hydroxyethylthioethyl, carboxyethylthioethyl, and ethylureaethylthioethyl.

10. The method of claim 5, wherein the polysiloxane polymer block comprises a monomer repeat unit selected from the group consisting structure (V) and structure (VI):

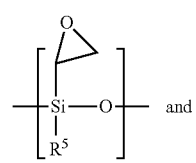

(V)

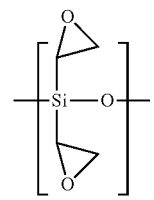

(VI)

wherein R⁵ is selected from the group consisting of alkyl, cycloalkyl, aryl, and aromatic.

11. The method of claim 10, wherein R⁵ is selected from the group consisting of methyl and ethyl.

12. The method of claim 5, wherein the polysiloxane polymer block comprises a monomer repeat unit selected from the group consisting of structure (VII) and structure (VIII):

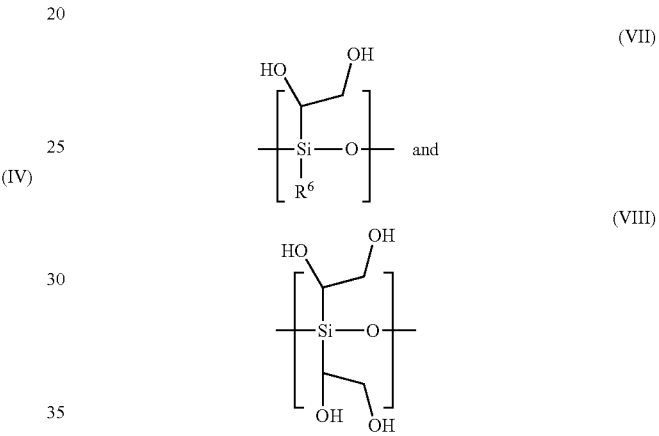

wherein R⁶ is selected from the group consisting of alkyl, cycloalkyl, aryl, and aromatic.

13. The method of claim 12, wherein R⁶ is selected from the group consisting of methyl and ethyl.

14. The method of claim 1, wherein the polysiloxane polymer block is selected from the group consisting of poly(methyl acetoxyethyl)siloxane); poly(methyl thioacetoxyethylsiloxane); poly(methyl hydroxyethylthioethylsiloxane); poly(methyl carboxyethylthioethylsiloxane); poly(methyl ethylureaethylthioethylsiloxane); poly(methyl oxiranylsiloxane); and poly(methyl 1,2-dihydroxyethylsiloxane).

15. The method of claim 1, wherein the self-assembling block copolymer further comprises a photoacid generator (PAG).

16. The method of claim 15, wherein the PAG is selected from the group consisting of triphenylsulfonium nonaflate; (trifluoro-methylsulfonyloxy)-bicyclo[2.2.1]hept-5-ene-2,3-dicarboximide (MDT); N-hydroxy-naphthalimide (DDSN); onium salts; benzoin tosylate; t-butylphenyl α-(p-toluenesulfonyloxy)-acetate; t-butyl α-(p-toluenesulfonyloxy)-acetate; sulfonic acid esters of N-hydroxyamides, imides, or combinations thereof; nitrobenzyl esters; s-triazine derivatives; N-camphorsulfonyloxynaphthalimide; N-pentafluorophenylsulfonyloxynaphthalimide; ionic iodonium sulfonates; perfluoroalkanesulfonates; aryl triflates; pyrogallol derivatives; trifluoromethanesulfonate esters of hydroxyimides; α,α'-bis-sulfonyl-diazomethanes; sulfonate esters of nitro-substituted benzyl alcohols; naphthoquinone-4-diazides; and alkyl disulfones.

17. The method of claim 16, wherein the block copolymer is irradiated after step (a) to form an acid.

18. A composition comprising a block copolymer comprising a polysiloxane-containing inorganic polymer block and an organic polymer block, wherein the polysiloxane-containing inorganic polymer block comprises a monomer repeat unit selected from the group consisting of structure (I) and structure (II):

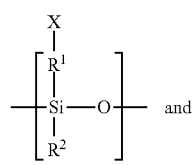
(I)

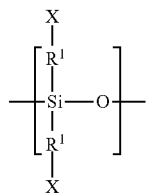
(II)

wherein $R^1$ is independently alkylene;

$R^2$ is selected from the group consisting of C1-C20 alkyl, cycloalkyl, aryl, and aromatic; and X is independently an electronegative group.

19. The composition of claim 18, wherein $R^1$ is independently selected from the group consisting of methylene, ethylene, and propylene;

$R^2$ is selected from the group consisting of methyl and ethyl; and

X is independently selected from the group consisting of acetoxy, substituted acetoxy, thioacetoxy, substituted thioacetoxy, benzoyl, substituted benzoyl, bromine, chlorine, and iodine.

20. A composition comprising a block copolymer comprising a polysiloxane-containing inorganic polymer block and an organic polymer block, wherein the polysiloxane-containing inorganic polymer block comprises a monomer repeat unit selected from the group consisting of structure (III) and structure (IV):

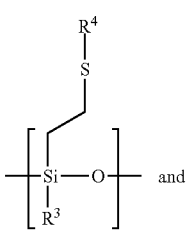
(III)

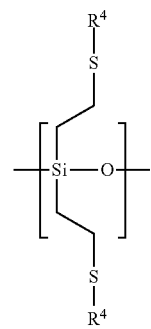
(IV)

wherein $R^3$ is selected from the group consisting of C1-C20 alkyl, cycloalkyl, aryl, and aromatic; and $R^4$ is independently selected from C1-C20 alkyl, cycloalkyl, aryl, hydroxy alkyl, alkylamine, alkylamide, and alkylurea.

21. The composition of claim 20, wherein $R^3$ is selected from the group consisting of methyl and ethyl; and $R^4$ is independently selected from the group consisting of hydroxyethylthioethyl, carboxyethylthioethyl, and ethylureaethylthioethyl.

22. A composition comprising a block copolymer comprising a polysiloxane-containing inorganic polymer block and an organic polymer block, wherein the polysiloxane-containing inorganic polymer block comprises a monomer repeat unit selected from the group consisting of structure (V) and structure (VI):

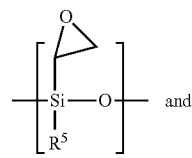
(V)

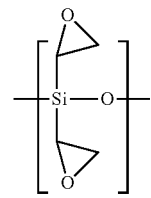
(VI)

wherein $R^5$ is selected from the group consisting of alkyl, cycloalkyl, aryl, and aromatic.

23. The composition of claim 22, wherein $R^5$ is selected from the group consisting of methyl and ethyl.

24. A composition comprising a block copolymer comprising a polysiloxane-containing inorganic polymer block and an organic polymer block, wherein the polysiloxane-containing inorganic polymer block comprises a monomer repeat unit selected from the group consisting of structure (VII) and structure (VIII):

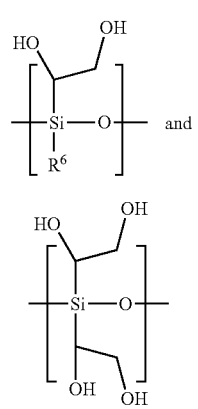
wherein R⁶ is selected from the group consisting of alkyl, cycloalkyl, aryl, and aromatic.
25. The composition of claim 24, wherein $R^6$ is selected from the group consisting of methyl and ethyl.
* * * * *